US006967995B1

(12) United States Patent
Hwang et al.

(10) Patent No.: US 6,967,995 B1
(45) Date of Patent: Nov. 22, 2005

(54) METHODS, SYSTEMS AND COMPUTER PROGRAM PRODUCTS FOR CARRIER DROP DETECTION USING A VARIABLE THRESHOLD

(75) Inventors: Dongming Hwang, Cary, NC (US); Robert John Schule, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,501

(22) Filed: Oct. 29, 1999

(51) Int. Cl.$^7$ ............................................. H04L 5/16
(52) U.S. Cl. .................................................. 375/222
(58) Field of Search .............................. 375/222, 224, 375/354, 356, 357, 358, 360, 316; 358/434, 358/436, 438, 439; 379/93.31, 93.32, 100.01

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |
| 4,577,310 A | 3/1986 | Korsky et al. | 370/58 |
| 4,578,796 A | 3/1986 | Charalambous et al. | 375/8 |
| 4,720,861 A | 1/1988 | Bertrand | 381/36 |
| 4,731,816 A | 3/1988 | Hughes-Hartogs | 379/98 |
| 4,756,007 A | 7/1988 | Qureshi et al. | 375/37 |
| 4,760,598 A | 7/1988 | Ferrell | 380/44 |
| 4,797,898 A | 1/1989 | Martinez | 375/7 |

(Continued)

FOREIGN PATENT DOCUMENTS

EP  0 473 116 A2  8/1991  ............ H04N 1/00

(Continued)

OTHER PUBLICATIONS

Erup, et al., *Interpolation in Digital Modems—Part II: Implementation and Performance*, IEEE Transactions on Communications, vol. 41, No. 6, pp. 998-1008 (Jun. 1993).

(Continued)

*Primary Examiner*—Tesfaldet Bocure
*Assistant Examiner*—Pankaj Kumar
(74) *Attorney, Agent, or Firm*—Scott W. Reid (57) ABSTRACT

Methods, systems and computer program products are provided which utilize a variable threshold for carrier drop detection. The carrier drop detection threshold is updated based on a recognized data sequence contained within the signal received by the modem. The received signal is demodulated to obtain the signal data and an updated threshold is latched when a desired data sequence is recognized in the demodulated data. Accordingly, the threshold may be updated and set as an offset from or a percentage of the carrier signal level at the time of receipt of the desired data sequence. For example, in a V.90 modem using a V.8 phase 1 sequence, receipt of the CM signal (for the answer modem) or the JM signal (for the call modem) may be used to latch an updated level for the carrier drop detection threshold, which may then be used for detecting carrier drop during the silence transmission at the end of phase 1 to allow reliable preparation of the modem for receipt of the INFO0 signal at the start of phase 2.

32 Claims, 5 Drawing Sheets

U.S. PATENT DOCUMENTS

| | | | |
|---|---|---|---|
| 4,833,706 A | 5/1989 | Hughes-Hartogs | 379/98 |
| 4,868,863 A | 9/1989 | Hartley et al. | 379/98 |
| 4,884,285 A | 11/1989 | Heynen et al. | 375/25 |
| 4,890,303 A | 12/1989 | Bader | 375/107 |
| 4,890,316 A | 12/1989 | Walsh et al. | 379/98 |
| 4,894,847 A | 1/1990 | Tjahjadi et al. | 375/121 |
| 4,901,333 A | 2/1990 | Hodgkiss | 375/98 |
| 4,943,980 A | 7/1990 | Dobson et al. | 375/42 |
| 4,953,210 A | 8/1990 | McGlynn et al. | 380/48 |
| 4,967,413 A | 10/1990 | Otani | 371/37.4 |
| 4,972,360 A | 11/1990 | Cuckier et al. | 364/724.04 |
| 4,985,902 A | 1/1991 | Gurcan | 375/14 |
| 4,991,169 A | 2/1991 | Davis et al. | 370/77 |
| 4,995,030 A | 2/1991 | Helf | 370/32.1 |
| 5,005,144 A | 4/1991 | Nakajima et al. | 364/565 |
| 5,007,047 A | 4/1991 | Sridhar et al. | 370/32.1 |
| 5,014,299 A | 5/1991 | Klupt et al. | 379/98 |
| 5,033,062 A | 7/1991 | Morrow et al. | 375/7 |
| 5,038,365 A | 8/1991 | Belloc et al. | 375/8 |
| 5,040,190 A | 8/1991 | Smith et al. | 375/4 |
| 5,052,000 A | 9/1991 | Wang et al. | 371/43 |
| 5,058,134 A | 10/1991 | Chevillat et al. | 375/39 |
| 5,065,410 A | 11/1991 | Yoshida et al. | 375/98 |
| 5,067,125 A | 11/1991 | Tsuchida | 370/79 |
| 5,068,875 A | 11/1991 | Quintin | 375/78 |
| 5,107,520 A | 4/1992 | Karam et al. | 375/60 |
| 5,111,481 A | 5/1992 | Chen et al. | 375/14 |
| 5,119,401 A | 6/1992 | Tsujimoto | 375/14 |
| 5,119,403 A | 6/1992 | Krishnan | 375/39 |
| 5,134,611 A | 7/1992 | Steinka et al. | 370/79 |
| 5,142,552 A | 8/1992 | Tzeng et al. | 375/14 |
| 5,157,690 A | 10/1992 | Buttle | 375/14 |
| 5,187,732 A | 2/1993 | Suzuki | 379/5 |
| 5,210,755 A | 5/1993 | Nagler et al. | 370/108 |
| 5,225,997 A | 7/1993 | Lederer et al. | 364/550 |
| 5,253,272 A | 10/1993 | Jaeger et al. | 375/60 |
| 5,253,291 A | 10/1993 | Naseer et al. | 379/406 |
| 5,260,974 A * | 11/1993 | Johnson et al. | 375/317 |
| 5,265,151 A | 11/1993 | Goldstein | 379/97 |
| 5,272,657 A * | 12/1993 | Basehore et al. | 708/422 |
| 5,285,474 A | 2/1994 | Chow et al. | 375/13 |
| 5,291,479 A | 3/1994 | Vaziri et al. | 370/58.2 |
| 5,311,578 A | 5/1994 | Bremer et al. | 379/97 |
| 5,317,594 A | 5/1994 | Goldstein | 375/8 |
| 5,351,134 A | 9/1994 | Yaguchi et al. | 358/435 |
| 5,353,280 A | 10/1994 | Ungerböck | 370/32.1 |
| 5,386,438 A | 1/1995 | England | 375/121 |
| 5,394,110 A | 2/1995 | Mizoguchi | 329/304 |
| 5,394,437 A | 2/1995 | Ayanoglu et al. | 375/222 |
| 5,398,303 A | 3/1995 | Tanaka | 395/51 |
| 5,402,445 A | 3/1995 | Matsuura | 375/229 |
| 5,406,583 A | 4/1995 | Dagdeviren | 375/5 |
| 5,418,842 A | 5/1995 | Cooper | 379/98 |
| 5,432,794 A | 7/1995 | Yaguchi | 371/5.5 |
| 5,434,884 A | 7/1995 | Rushing et al. | 375/235 |
| 5,475,711 A | 12/1995 | Betts et al. | 375/240 |
| 5,491,720 A | 2/1996 | Davis et al. | 375/222 |
| 5,513,216 A | 4/1996 | Gadot et al. | 375/233 |
| 5,519,703 A | 5/1996 | Chauffour et al. | 370/84 |
| 5,528,625 A | 6/1996 | Ayanoglu et al. | 375/222 |
| 5,528,679 A | 6/1996 | Taarud | 379/34 |
| 5,533,048 A | 7/1996 | Dolan | 375/222 |
| 5,534,913 A | 7/1996 | Majeti et al. | 348/7 |
| 5,546,395 A | 8/1996 | Sharma et al. | 370/84 |
| 5,563,908 A | 10/1996 | Kaku et al. | 375/222 |
| 5,566,211 A | 10/1996 | Choi | 375/332 |
| 5,598,401 A | 1/1997 | Blackwell et al. | 379/94 |
| 5,625,643 A | 4/1997 | Kaku et al. | 375/222 |
| 5,634,022 A | 5/1997 | Crouse et al. | 395/704 |
| 5,640,387 A | 6/1997 | Takahashi et al. | 370/359 |
| 5,646,958 A | 7/1997 | Tsujimoto | 375/233 |
| 5,671,250 A | 9/1997 | Bremer et al. | 375/222 |
| 5,694,420 A | 12/1997 | Ohki et al. | 375/222 |
| 5,710,792 A | 1/1998 | Fukawa et al. | 375/229 |
| 5,724,393 A | 3/1998 | Dagdeviren | 375/296 |
| 5,726,765 A | 3/1998 | Yoshida et al. | 358/412 |
| 5,729,226 A | 3/1998 | Betts et al. | 341/94 |
| 5,732,104 A | 3/1998 | Brown et al. | 375/222 |
| 5,734,663 A | 3/1998 | Eggenberger | 371/39.1 |
| 5,751,717 A | 5/1998 | Babu et al. | 370/466 |
| 5,751,796 A | 5/1998 | Scott et al. | 379/93.31 |
| 5,754,594 A | 5/1998 | Betts et al. | 375/285 |
| 5,757,849 A | 5/1998 | Gelblum et al. | 375/222 |
| 5,757,865 A | 5/1998 | Kaku et al. | 375/344 |
| 5,761,247 A | 6/1998 | Betts et al. | 375/316 |
| 5,768,311 A | 6/1998 | Betts et al. | 375/222 |
| 5,778,024 A | 7/1998 | McDonough | 375/216 |
| 5,784,377 A | 7/1998 | Baydar et al. | 370/463 |
| 5,784,405 A | 7/1998 | Betts et al. | 375/222 |
| 5,784,415 A | 7/1998 | Chevillat et al. | 375/341 |
| 5,793,809 A | 8/1998 | Holmquist | 375/242 |
| 5,796,808 A | 8/1998 | Scott et al. | 379/93.31 |
| 5,801,695 A | 9/1998 | Townshend | 375/340 |
| 5,805,669 A | 9/1998 | Bingel et al. | 379/28 |
| 5,809,075 A | 9/1998 | Townshend | 375/254 |
| 5,812,537 A | 9/1998 | Betts et al. | 370/286 |
| 5,815,534 A | 9/1998 | Glass | 375/326 |
| 5,825,816 A | 10/1998 | Cole et al. | 375/222 |
| 5,825,823 A | 10/1998 | Goldstein et al. | 375/286 |
| 5,822,371 A | 11/1998 | Strolle et al. | 375/242 |
| 5,831,561 A | 11/1998 | Cai et al. | 341/106 |
| 5,835,532 A | 11/1998 | Strolle et al. | 375/233 |
| 5,835,538 A | 11/1998 | Townshend | 375/295 |
| 5,838,724 A | 11/1998 | Cole et al. | 375/222 |
| 5,839,053 A | 11/1998 | Bosch et al. | 455/13.1 |
| 5,844,940 A | 12/1998 | Goodson et al. | 375/222 |
| 5,850,388 A | 12/1998 | Anderson et al. | 370/252 |
| 5,850,421 A | 12/1998 | Misra et al. | 375/354 |
| 5,852,631 A | 12/1998 | Scott | 375/222 |
| 5,862,141 A | 1/1999 | Trotter | 370/468 |
| 5,862,179 A | 1/1999 | Goldstein et al. | 375/242 |
| 5,862,184 A | 1/1999 | Goldstein et al. | 375/295 |
| 5,870,429 A | 2/1999 | Moran, III et al. | 375/222 |
| 5,872,817 A | 2/1999 | Wei | 375/341 |
| 5,881,066 A | 3/1999 | Lepitre | 371/20.5 |
| 5,881,102 A | 3/1999 | Samson | 375/222 |
| 5,887,027 A | 3/1999 | Cohen et al. | 375/222 |
| 5,911,115 A | 6/1999 | Nair et al. | 455/63 |
| 5,914,982 A | 6/1999 | Bjarnason et al. | 375/222 |
| 5,918,204 A | 6/1999 | Tsurumaru | 704/214 |
| 5,926,506 A | 7/1999 | Berthold et al. | 375/222 |

FOREIGN PATENT DOCUMENTS

| | | | | |
|---|---|---|---|---|
| EP | 0 659 007 A2 | 11/1994 | | H04M 11/06 |
| EP | 0 669 740 A2 | 12/1994 | | H04L 27/00 |
| FR | 2 345 019 | 3/1976 | | H04L 27/10 |
| WO | WO 96/18261 | 6/1996 | | H04M 11/00 |
| WO | WO 98/37657 | 8/1998 | | |

OTHER PUBLICATIONS

Fischer, *Signal Mapping for PCM Modems, V-pcm Rapporteur Meeting*, Sunriver, Oregon, USA, , 5 pgs. (Sep. 4-12, 1997).

Gardner, *Interpolation in Digital Modems—Part 1: Fundamentals, IEEE Transactions on Communications*, vol. 41, No. 3, pp. 501-507 (Mar. 1993).

Humblet et al., *The Information Driveway, IEEE Communications Magazine*, pp. 64-68 (Dec. 1996).

Kalet et al., *The Capacity of PCM Voiceband Channels, IEEE International Conference on Communications '93*, pp. 507-511 (Geneva, Switzerland, May 23-26, 1993).

Mueller et al., *Timing Recovery in Digital Synchronous Data Receiver, IEEE Transactions on Communications*, vol. Com-24, No. 5, pp. 516-531 (May 1976).
Okubo et al., *Building Block Design of Large Capacity PCM-TDMA Subscriber System and Direct Digital Interface to Digital Exchange*, Japan Radio Co., Ltd., pp. 69-73 (Japan).
Pahlavan et al., *Nonlinear Quantization and the Design of Coded and Uncoded Signal Constellations, IEEE Transactions on Communications*, vol. 39, No. 8, pp. 1207-1215 (Aug. 1991)
Proakis, *Digital Signaling Over a Channel with Intersymbol Interference, Digital Communications*, pp. 373, 381 (McGraw-Hill Book Company, 1983).
Williams et al., *Counteracting the Quantisation Noise from PCM Codecs*, BT Laboratories, pp. 24-29 (UK).
A Digital Modem and Analogue Modem Pair for Use on the Public Switched Telephone Network (PSTN) at Data Signalling Rates of Up to 56 000 Bit/s Downstream and 33 600 Bit/s Upstream, *ITU-T V.90* (Sep. 1998).
Series V: Data Communication Over the Telephone Network; Interfaces and voiceband modems; A modem operating at data signalling rates of up to 33 600 bit/s for use on the general switched telephone network and on leased point-to-point 2-wire telephone type circuits, *ITU-T V.34* (Oct. 1996).
Bell, R.A., et al., *Automatic Speed Reduction and Switched Network Back-up, IBM Technical Disclosure Bulletin*, vol. 32, No. 1, pp. 154-157 (Jun. 1989).
Abbiate, J.C.. et al., *Variable-Data Transmission Modem, IBM Technical Disclosure Bulletin*, vol. 17, No. 11, pp. 3301-3302 (Apr. 1975).
Data Communication Over the Telephone Network; Procedures for Starting Sessions of Data Transmission Over the General Switched Telephone Network, *ITU-T V.8* (Sep. 1994).
*Line Quality Monitoring Method, IBM Technical Disclosure Bulletin*, vol. 18, No. 8, pp. 2726-2726 (Jan. 1976).
*Loopback Tests for V.54 Data Communication Equipment, IBM Technical Disclosure Bulletin*, vol. 32, No. 3A, pp. 295-299 (Aug. 1989).
*On-Line Real Time Modem Testing, IBM Technical Disclosure Bulletin*, vol. 20, No. 6, pp. 2252-2254 (Nov. 1977).
Pierobon, Gianfranco L., *Codes of Zero Spectral Density at Zero Frequency, IEEE Transactions on Information Theory*, vol. IT-30, No. 2, pp. 435-439 (Mar., 1984).
Marcus, Brian H, et al., *On Codes with Spectral Nulls at Rational Submultiples of the Symbol Frequency, IEEE Transactions on Information Theory*, vol. IT-33, No. 4, pp. 557-568 (Jul. 1987).
Fischer, Robert, et al., *Signal Mapping for PCM Modems, ITU-Telecommunications Standardization Sector PCM '97-120, V.pcm Rapporteur Meeting*, (Sunriver; Oregon; Sep. 4-12, 1997).
*Pulse Code Modulation (PCM) of Voice Frequencies, ITU-T*, Recommendation G.711 (Geneva, 1972).
Series G: Digital Transmission Systems; Terminal equipments—Coding of analogue signals by pulse code modulation; Pulse code modulation (PCM) of voice frequencies, *ITU-T*, Recommendation G.711 (Geneva, 1996).
Data Communication Over the Telephone Network; Error-Correcting Procedures for DCEs Using Asynchronous-to-Synchronous Conversion, *ITU-T V.42* (Mar. 1993).

*Improvement to Spectral Shaping Technique, Research Dislosure*, V.41, n415,415111, pp. 1550-1551 (Nov. 1998).
*TIA Standard Draft: North American Telephone Network Transmission Model for Evaluating Analog Client to Digitally Connected Server Modems*, Telecommunications Industry Association, PN3857,Draft 10 (Feb. 1999).
Davis, Gordon T., *DSP and MATLAB implementation of model-based constellation generation* (Sep. 18, 1998).
Woodruff, K.R., et al, *Automatic and Adaptive System and Efficient Communication in Noisy Communication Line Environments, IBM Technical Disclosure Bulletin*, vol. 24, No. 9, pp. 4627-4629 (Feb. 1982).
Godard, D., et al., *Decision Feedback Equalizer Stabilization in Adaptive Mode, IBM Technical Disclosure Bulletin*, vol. 24, No. 11A, pp. 5691-5692 (Apr. 1982).
Borgnis-Desbordes, P., et al., *Variable-Speed Data Transmission, IBM Technical Disclosure Bulletin*, vol. 27, No. 4A, pp. 2269-2270 (Sep. 1984).
Couland, G., et al., *Analog Wrap Self-Test in Modems During Retrain Operations, IBM Technical Disclosure Bulletin*, vol. 28, No. 6, p. 2457 (Nov. 1985).
Maddens, F., *Sixteen-State Forward Convolutional Encoder, IBM Technical Disclosure Bulletin*, vol. 28, No. 6, pp. 2466-2468 (Nov. 1985).
*Remote Modem-Type Self-Learning, IBM Technical Disclosure Bulletin*, vol. 28, No. 6, pp. 2398-2399 (Nov. 1985).
Maddens, F., *Sixteen-State Feedback Convolutional Encoder, IBM Technical Disclosure Bulletin*, vol. 28, No. 10, pp. 4212-4213 (Mar. 1986).
Bell, R. A., et al., *Automatic Speed Reduction and Switched Network Back-up, IBM Technical Disclosure Bulletin*, vol. 32, No. 1, pp. 154-157 (Jun. 1989).
Nobakht, R.A., *Trellis-Coded Modulation Coding Scheme for a 19/2 Kbps Modem, IBM Technical Disclosure Bulletin*, vol. 36, No. 11, pp. 167-170 (Nov. 1993).
Nobakht, R.A., *Unified Table Based Subset Decoder for the Viterbi Algorithm, IBM Technical Disclosure Bulletin*, vol. 37, No. 09, pp. 581-587 (Sep. 1994).
Nobakht, R.A., *Trellis Subset Decoder Algorithm Based on a Pattern Recognition Scheme, IBM Technical Disclosure Bulletin*, vol. 37, No. 10, pp. 693-697 (Oct. 1994).
Barlet, J., et al., *Full Speed Recovery in High Speed Modems, IBM Technical Disclosure Bulletin*, vol. 23, No. 2, pp. 641-643 (Jul. 1980).
Dialog Abstract, *Sample rate converter for duplex modem*, European Patent No. 285413.
Dialog Abstract, *Two-speed full-duplex modem for telephone network*, PCT No. WO 8501407.
Dialog Abstract, *Digital data transmission system*, European Patent No. 124674.
Dialog Abstract, *Facsimile communication controller*, Japanese Publication No. 04-175060 (Jun. 23, 1992).
Dialog Abstract, *Picture communication equipment*, Japanese Publication No. 03-120954 (May 23, 1991).
Dialog Abstract, *Ratio date transmission system*, Japanese Publication No. 01-179535 (Jul. 17, 1989).
Dialog Abstract, *Facsimile device*, Japanese Publication No. 57-164654 (Oct. 9, 1982).
Dialog Abstract, *Data repeater*, Japanese Publication No. 57-087255 (May 31, 1982).
Dialog Abstract, *Blinding training method for decision feedback equaliser having feed-forward and feedback filters*, European Patent No. 880253.

Dialog Abstract, *Processing method for distorted signal received by qam receiver*, European Patent No. 465851.

Dialog Abstract, *Establishing wireless communication channel*, PCT No. WO 9905820.

Dialog Abstract, *High-Speed rate adaptive subscriber line digital data modem*, PCT No. WO 9830001.

Dialog Abstract, *Digital modem in digital modulation system*, Japanese Patent No. 8116341.

Dialog Abstract, *Communication equipment and radio communication adapter*, Japanese Publication No. 08-340289 (Dec. 24, 1996).

Dialog Abstract, *Data recording method*, Japanese Publication No. 05-089597 (Apr. 9, 1993).

Dialog Abstract, *Transmission control system for data communication and its modem equipment*, JapanesePublication No. 02-228853 (Sep. 11, 1990).

Naguib, A.F., et al., Dialog Abstract, *A space-time coding modem for high-data-rate wireless communications, IEEE Journal of Selected Areas in Communications*, vol. 16, No. 8, (Oct. 1998), pages not provided.

Denno, S., et al., Dialog Abstract, *Mbit/s burst modem with an adaptive equalizer for TDMA mobile radio communications, IEICE Transactions on Communications*, vol. E81-B, No. 7, (Jul. 1998), pages not provided.

Naguib, A.F., et al., Dialog Abstract, *A space-time coding modem for high-data-rate wireless communications, GLOBECOM 97, IEEE Global Telecommunications Conference*, vol. 1, (1997), pages not provided.

Kobayashi, K., et al., Dialog Abstract, *Fully digital burst modem for satellite multimedia communication systems, IEICE Transactions on Communications*, vol. E80-B, No. 1, (Jan. 1997), pages not provided.

Skellern, D.J., et al., Dialog Abstract, *A high speed wireless LAN, IEEE Micro*, vol. 17, No. 1, (Jan.-Feb. 1997), pages not provided.

Schilling, D.L., et al., Dialog Abstract, *The FAVR meteor burst communication experiment, Military Communications in a Changing World MILCOM '91* (Nov. 4-7, 1991).

Jacobsmeyer, J.M., Dialog Abstract, *Adaptive trellis-coded modulation for bandlimited meteor burst channels, IEEE Journal on Selected Areas in Communications*, vol. 10, No. 3, (Apr. 1992), pages not provided.

Sato, T., et al., Dialog Abstract, *Protocol configuration and verification of an adaptive error control scheme over analog cellular networks, IEEE Transactions on Vehicular Technology*, vol. 41, No. 1, (Feb. 1992), pages not provided.

Lee, L.-N., et al., Dialog Abstract, *Digital signal processor-based programmable BPSK/QPSK/offset-QPSK modems, COMSAT Technical Review*, (Fall 1989), pages not provided.

Sato, T., et al., Dialog Abstract, *Error-free high-speed data modem, OKi Technical Review*, vol. 56, No. 133, (Apr. 1989), pages not provided.

Seo, J.-S, et al., Dialog Abstract, *Performance of convolutional coded SQAM in hardlimited satellite channels, IEEE International Conference on Communications BOSTONICC/89*, vol. 2, (Jun. 11-14, 1989), pages not provided.

Murakama, K., et al., Dialog Abstract, *FEC combined burst-modem for business satellite communications use, IEEE/IECE Global Telecommunications Conference 1987*, vol. 1, (Japan, Nov. 15-18, 1987), pages not provided.

McVerry, F., Dialog Abstract, *Performance of a fast carrier recovery scheme for burst-format DQPSK transmission over satellite channels, International Conference on Digital Processing of Signals in Communications*, (United Kingdom, 1985), pages not provided.

Filter, J.H.J., Dialog Abstract, *An algorithm for detecting loss of synchronisation in data transmission test sets (modems), Transactions of the South African Institute of Electrical Engineers*, vol. 76, No. 1, (Jan. 1985), pages not provided.

Gersho, A., Dialog Abstract, *Reduced complexity implementation of passband adaptive equlizers, IEEE Journal on Selected Areas in Communications*, vol. SAC-2, No. 5, (Sep. 1984), pages not provided.

Dialog Abstract, *High-speed full-duplex modem reduces telephone connect time, EDN*, vol. 27, No. 18, p. 77 (Sep. 15, 1982), pages not provided.

Chadwick, H., et al., Dialog Abstract, *Performance of a TDMA burst modem through a dual nonlinear satellite channel, Fifth International Conference on Digital Satellite Communications*, (Italy, Mar. 23-26, 1981), pages not provided.

Nussbaumer, H., Dialog Abstract, *Reducing the acquisition time in an automatic equalizer, IBM Technical Disclosure Bulletin*, vol. 18, No. 5, (Oct. 1975), pages not provided.

Uzunoglu, V., et al., Dialog Abstract, *Synchronous and the coherent phase-locked synchronous oscillators: new techniques in synchronization and tracking, IEEE Transactions on Circuits and Systems*, vol. 36, No. 7, (Jul. 1989), pages not provided.

Minei, I., et al., Dialog Abstract, *High-speed Internet access through undirectional geostationary satellite channels, IEEE Journal on Selected Areas in Communications*, vol. 17, No. 2, (Feb. 1999), pages not provided.

Ovadia, S., Dialog Abstract, *The effect of interleaver depth and QAM channel frequency offset on the performance of multichannel AM-VSB/256-QAM video lightwave transmission systems, International Conference on Telecommunications: Bridging East and West Through Communications*, vol. 1, (Greece, Jun. 21-25, 1998), pages not provided.

Johnson, R.W., et al., Dialog Abstract, *Error correction coding for serial-tone HG transmission, Seventh International Conference on HF Radio Systems and Techniques*, (United Kingdom, Jul. 7-10, 1997).

Karasawa, Y., et al., Dialog Abstract, *Cycle slip in clock recovery on frequency-selective fading channels, IEEE Transactions on Communications*, vol. 45, No. 3, (Mar. 1997), pages not provided.

Umehira, M., et al., Dialog Abstract, *Design and performance of burst carrier recovery using a phase compensated filter, Transactions of the Institute of Electronics, Information and Communication Engineers*, vol. J78B-II, No. 12, (Dec. 1995), pages not provided.

De Bot, P., et al., Dialog Abstract, *An example of a multi-resolution digital terrestrial TV modem, Proceedings of ICC '93—IEEE International Conference on Communications*, vol. 3, (Switzerland, May 23-26, 1993), pages not provided.

Lei, Chen, et al., Dialog Abstract, *Single-tone HF high speed data modem, Proceedings of TENCON '93—IEEE Region 10 International Conference on Computers, Communications and Automation*, vol. 3, (China, Oct. 19-21, 1993), pages not provided.

Woerner, B.D., et al., Dialog Abstract, *Simulation issues for future wireless modems, IEEE Communications*, vol. 32, No. 7, (Jul. 1994), pages not provided.

Sato, T., et al., Dialog Abstract, *Vehicle terminal equipment with dedicated DSP, Oki Technical Review*, vol. 58, No. 144, (Jul. 1992), pages not provided.

Sato, T., et al., Dialog Abstract, *Protocol configuration and verification of an adaptive error control scheme over analog cellular networks*, IEEE Transactions on Vehicular Technology, vol. 41, No. 1, (Feb. 1992), pages not provided.

Tamm, Yu.A., Dialog Abstract, *The effect of suppressing harmonic interference using an adaptive equalizer*, Elektrosvyaz, vol. 45, No. 3, (Mar. 1990), pages not provided.

Saleh, A.A.M., et al., Dialog Abstract, *An experimental TDM indoor radio communications system using slow frequency hopping and coding*, IEEE Transactions on Communications, vol. 39, No. 1, (Jan., 1991), pages not provided.

Nergis, A., Dialog Abstract, *Optimum HF digital communication systems with block coding and interleaving techniques*, Proceedings of the 1990 Bilkent International Conference on New Trends in Communication, Control and Signal Processing, vol. 1, (Turkey, Jul. 2-5, 1990) pages not provided.

Kawamata, F., et al., Dialog Abstract, *An evaluation of voice codecs and facsimiles*, Review of the Communications Research Laboratory, vol. 36, (Mar. 1990), pages not provided.

Sato, T., et al., Dialog Abstract, *Error-free high-speed data transmission protocol simultaneously applicable to both wire and mobile radio channels*, 38th IEEE Vehicular Technology Conference: 'Telecommunications Freedom—Technology on the Move', (Jun. 15-17, 1988), pages not provided.

Dialog Abstract, *1200-bit/s cellular modem DLD03H*, Oki Technical Review, vol. 53, No. 127, (Jul. 1987), pages not provided.

Chamberlain, J.W., et al., Dialog Abstract, *Design and field test of a 256-QAM DIV modem*, IEEE Journal on Selected Areas in Communications, vol. SAC-5, No. 3, (Apr. 1987), pages not provided.

De Cristofaro, R., et al., Dialog Abstract, *A 120 Bv/s QPSK modem designed for the INTELSAT TDMA network*, International Journal of Satellite Communications, vol. 3, Nos. 1-2, pages not provided.

Shumate, A., Dialog Abstract, *Error correction coding for channels subject to occasional losses of bit count integrity*, IEEE military Communications Conference, vol. 1, (Oct. 21-24, 1984), pages not provided.

Suyderhoud, H., et al., Dialog Abstract, *Investigation of 9.6 kb/s data transmission via a PCM link at 64 kb/s with and without link errors*, International Journal of Satellite Communications, vol. 2, No. 1, (Jan.-Mar., 1984), pages not provided.

Smith, C., Dialog Abstract, *Relating the performance of speech processors to the bit error rate*, Speech Technology, vol. 2, No. 1, (Sep.-Oct. 1983), pages not provided.

Suyderhoud, H., et al., Dialog Abstract, *Investigation of 9.6-kbit/s data transmission via a PCM link at Communications Proceedings*, (Sep. 19, 23, 1983), pages not provided.

Kittel, L., Dialog Abstract, *Analogue and discrete channel models for signal transmission in mobile radio*, Frequenz, vol. 36, Nos. 4-5, (Apr.-May 1982), pages not provided.

Farrell, P.G., et al., Dialog Abstract, *Soft-decision error control of h.f. data transmission*, IEE Proceedings F (Communications, Radar and Signal Processing), vol. 127, No. 5, Oct. 1980, pages not provided.

Johnson, A.L., Dialog Abstract, *Simulation and implementation of a modulation system for overcoming ionospheric scintillation fading*, AGARD Conference Proceedings No. 173 on Radio Systems and the Ionosphere, (Greece, May 26-30, 1975) pages not provided.

Matsumura, K., et al., Dialog Abstract, *Anti-interference data-transmission set of HF Radio equipment*, Mitsubishi Electric Engineer, No. 41, (Sep., 1974), pages not provided.

Blank, H.A., et al., Dialog Abstract, *A Markov error channel model*, 1973 National Telecommunications Conference, vol. 1, (Nov. 26-28, 1973), pages not provided.

McGruther, W.G., Dialog Abstract, *Long term error performance data for operation at 2400 bps on a nonswitched private line network*, Summaries of papers presented at 1970 Canadian symposium on communications, (Canada, Nov. 12-13, 1970), pages not provided.

Burton, H.O., et al., Dialog Abstract, *On the use of error statistics from data transmission on telephone facilities to estimate performance of forward-error-correction*, 1970 international conference on communications, p. 21 (Jun. 8-10, 1970), pages not provided.

Bowen, R.R., Dialog Abstract, *Application on burst error correction codes to data modems for dispersive channels*, Proceedings of the 1970 international symposium on information theory, (Netherlands, Jun. 15-19, 1970), pages not provided.

Pierce, A.W., et al., Dialog Abstract, *Effective application of forward-acting error-control coding to multichannel h.f. data modems*, IEEE Transactions on Communication Technology, vol. Com-18, No. 4, (Aug. 1970), pages not provided.

West, R.L., et al., Abstract, *Data Concentration Method*, IBM Technical Disclosure Bulletin, pp. 487-489; http://w3.infogate.ibm.com:1207/SESS506884/GETDOC/39/2/1 (Jul., 1975).

Haas, L.C., et al., Abstract, *Received Line Signal Quality Analysis*, IBM Technical Disclosure Bulletin, pp. 5414-5416; http://w3.infogate.ibm.com;1207/SESS506884/GETDOC/43/1/1 (May, 1981).

Nussbaumer, H., Abstract, *Reducing the Acquisition Time in an Automatic Equalizer*, IBM Technical Disclosure Bulletin, pp. 1465-1479; http://w3.infogate.ibm.com:1207/SESS506884/GETDOC/40/2/1 (Oct. 1975).

Dialog Abstract, *Listener echo canceller for digital communication system*, PCT No. WO 9310607.

Dialog Abstract, *Reduced time remote access method for modem computer*, PCT No. WO 9209165.

\* cited by examiner

METHODS, SYSTEMS AND COMPUTER PROGRAM PRODUCTS FOR CARRIER DROP DETECTION USING A VARIABLE THRESHOLD

FIELD OF THE INVENTION

The present invention relates generally to the field of modems, and, more particularly, to modem carrier drop detection.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the public switched telephone network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has been very slow due to the substantial investment required of network providers for new equipment. Because ISDN is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). In recent years, local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (ie., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions outside of the conversion made at the subscriber's modem to enable transmission at 56 kbps.

Figure 1:
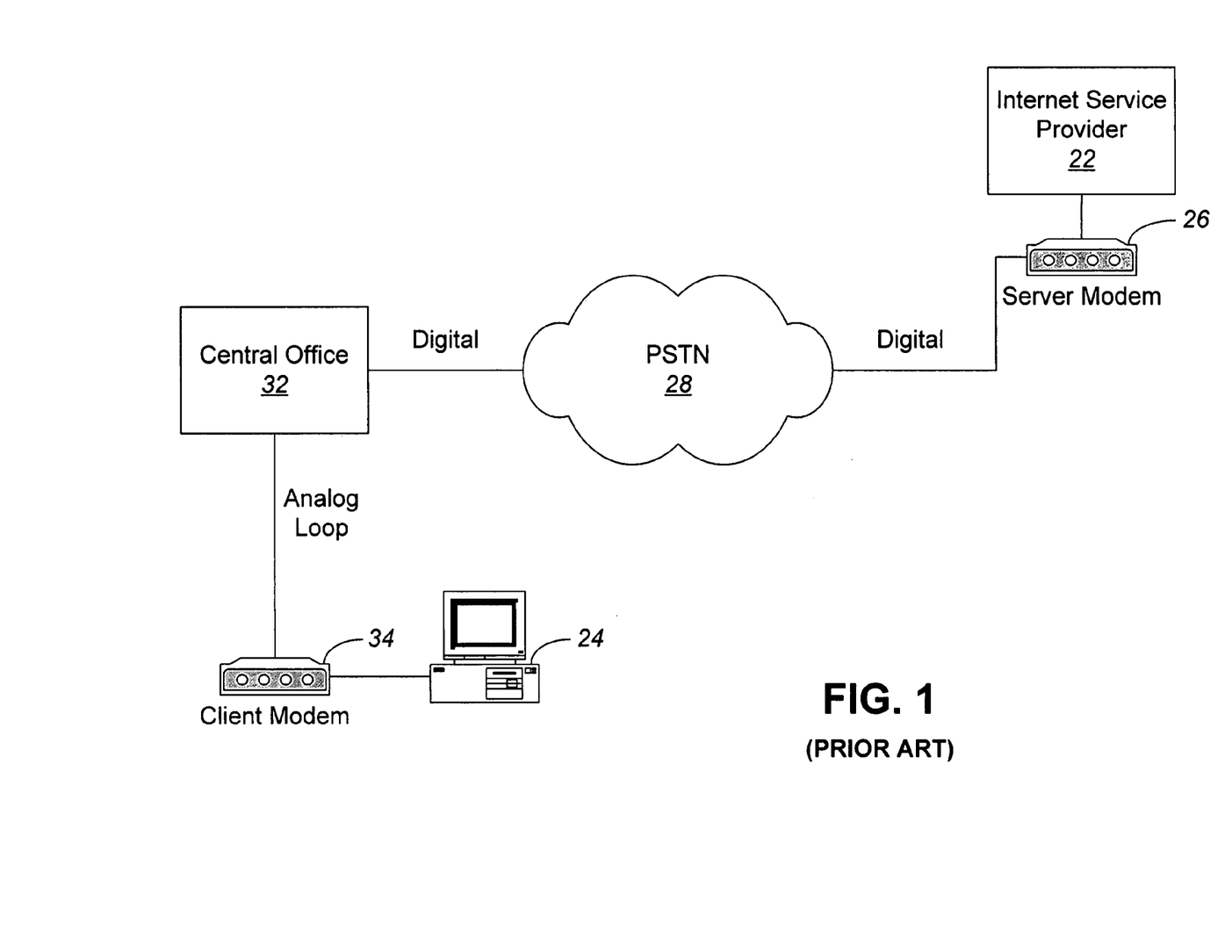
FIG. 1 is block diagram illustrating a typical V.90 connection between a subscriber and an ISP in accordance with the prior art.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Figure 2:
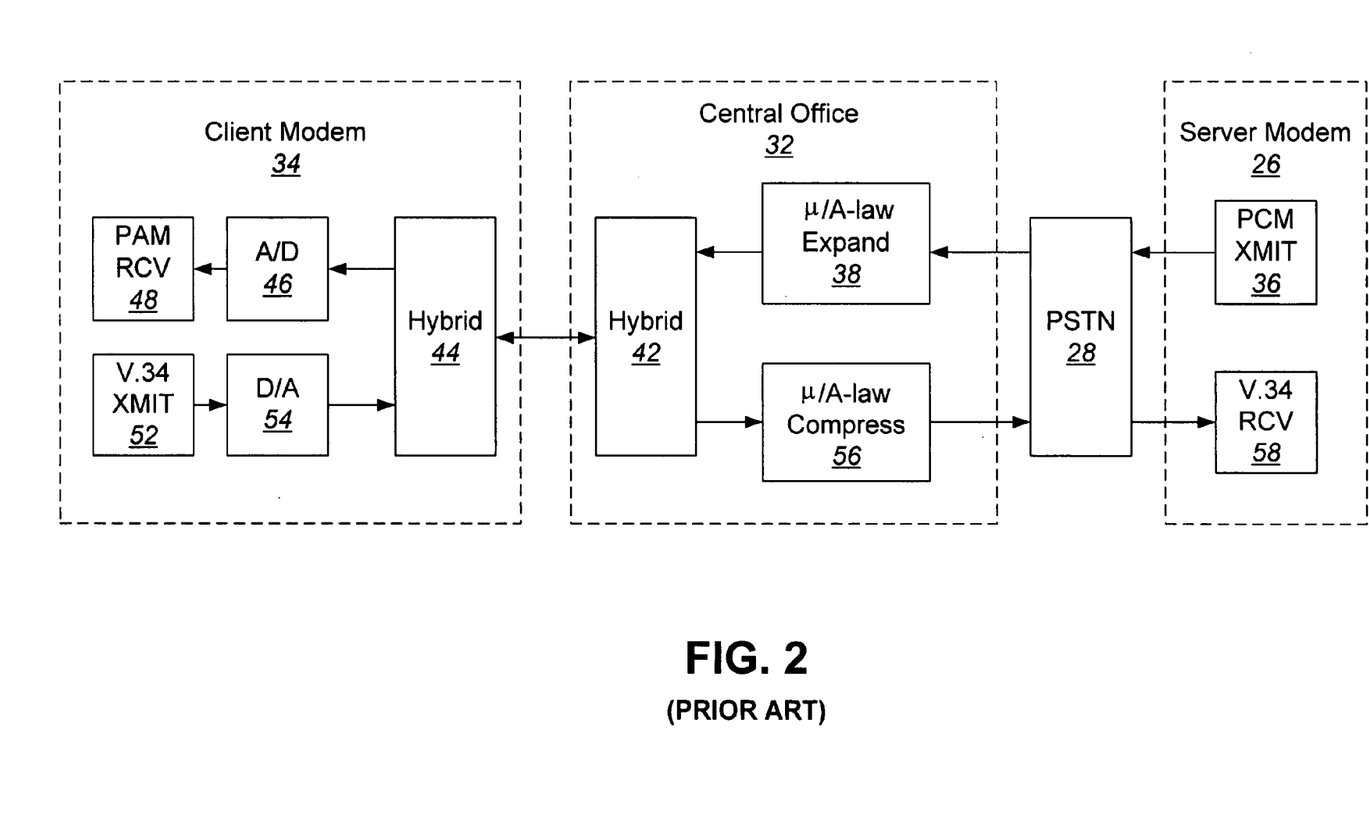
FIG. 2 is a detailed block diagram of the internal architecture and connections between the client modem, the central office, and the server modem of FIG. 1.

Transmission from the server modem 26 to the client modem 34 will be described first. The information to be transmitted is first encoded using only the 256 PCM codewords used by the digital switching and transmission equipment in the PSTN 28. These PCM codewords are transmitted towards the PSTN by the PCM transmitter 6 where they are received by a network codec. The PCM data is then transmitted through the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38.

These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed hereinbefore. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either i-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard only offers increased data rates (e.g., data rates up to 56 kbps) in the downstream direction from a server to a subscriber or client. Upstream communication still takes place at conventional data rates as provided for in the V.34 standard. Nevertheless, this asymmetry is particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists of mainly keystroke and mouse commands, which are readily handled by the conventional rates provided by the V.34 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path within the network. Nevertheless, other digital impairments, such as robbed bit signaling (RBS) and digital mapping through PADs which results in attenuated signals, can also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Articles such as Humblet et al., "The Information Driveway," IEEE Communications Magazine, December 1996, pp. 64–68, Kalet et al., "The Capacity of PCM Voiceband Channels," IEEE International Conference on Communications '93, May 23–26, 1993, Geneva, Switzerland, pp. 507–511, Fischer et al., "Signal Mapping for PCM Modems," V-pcm Rapporteur Meeting, Sunriver, Oreg., USA, Sep. 4–12, 1997, and Proakis, "Digital Signaling Over a Channel with Intersymbol Interference," Digital Communications, McGraw-Hill Book Company, 1983, pp. 373, 381, provide general background information on digital communication systems.

Various modem protocols include startup phases which, in practice, are implemented using, carrier drop detection. For example, the V.90 standard, along with other standards, such as the V.34 standard, begin startup operations with phase 1 procedures classified as network interaction. The phase 1 network interaction segment of startup operations is followed by the phase 2 operations classified as channel probing and ranging. Additional procedures are defined for phase 2 and phase 3 under the V.90 standard. At various points in the startup procedures for V.90 and other modem protocols, carrier drop detection may be utilized to transition the client and server modems to transition to subsequent operations. The transitions may include reconfiguration of receivers and/or other related operations.

It is known to provide modems with carrier detectors as described, for example in U.S. Pat. Nos. 5,563,908 and 5,625,643. These disclosures relate to use of an energy detector as a carrier detector and further using a fixed threshold to recognize carrier drop. These references further discuss an implementation of such a detector which is directed towards improving performance when the signal is subject to effects such as time dispersion. More particularly, a tone signal is appended to the data transmission, the tone signal being used to detect the absence of a carrier indicating the end of the data transmission.

However, many of the proposed protocols preclude the use of such an appended tone and alternative approaches to improving reliability of carrier drop detection for such systems are needed. One proposed approach to carrier drop detection is described in U.S. Pat. No. 5,815,534 entitled "Detector of Carrier Loss in a Fax Modem" (the '534 patent). The '534 patent discusses a carrier loss detector which utilizes a variable threshold rather than a fixed threshold to detect the end of a page of a fax transmission. A particular frequency pattern associated with a phase of a transmission pursuant to the V.27 standard is used to initiate updating of the threshold input to the carrier loss detection circuit. For example, in one embodiment of the '534 patent, the update is initiated based on a comparison of the magnitude of an unfiltered carrier signal to the magnitude of a filtered version with the filtering selected to cause a deviation between the signals during the phase with a particular associated frequency pattern. As with the approach of adding a tone, such an identifiable frequency pattern is not always available at the points where carrier drop detection is required under various modem communication standards such as V.90. Accordingly, improved carrier drop detection would be beneficial for use under such conditions.

SUMMARY OF THE INVENTION

It is an object of the present invention to provide methods, systems and computer program products which may more reliably detect carrier drop in a modem.

It is a further object of the present invention to provide such methods, systems and computer program products which may be tolerant of variations in line conditions and carrier signal levels.

These and other objects, advantages, and features of the present invention are provided by methods, systems and computer program products which utilize a variable threshold for carrier drop detection. The carrier drop detection threshold is updated based on a recognized data sequence (signal data) contained within the signal received by the modem. The received signal is demodulated to obtain the signal data and an updated threshold is latched when a desired data sequence is recognized in the demodulated data. Accordingly, the threshold may be updated and set as an offset from or a percentage of the carrier signal level at the time of receipt of the desired data sequence. For example, in a V.90 modem using a V.8 phase 1 sequence, receipt of the CM signal (for the answer modem) or the JM signal (for the call modem) may be used to latch an updated level for the carrier drop detection threshold, which may then be used for detecting carrier drop during the silence transmission at the end of phase I to allow reliable preparation of the modem for receipt of the INFO0 signal at the start of phase 2.

In one embodiment of the present invention, a method for modem carrier drop detection is provided including demodulating a received signal to provide signal data and updating a carrier drop detection threshold based on the received signal responsive to a selected data pattern in the signal data. A carrier drop is then detected based on the carrier drop detection threshold. In one embodiment, the modem uses a V.8 standard during startup and the carrier drop detection threshold is updated responsive to a selected data pattern in the signal data corresponding to at least one of a CM signal and a JM signal.

In a further embodiment of the present invention, carrier drop detection operations include setting a flag to indicate receipt of at least one of a valid CM signal and a valid JM signal and latching an output of a signal strength detector responsive to setting of the flag, the signal strength detector being coupled to the received signal and the output of the signal strength detector corresponding to a signal strength level of the received signal. The carrier drop detection threshold is then set to a value a predetermined amount below the latched output of the signal strength detector responsive to setting of the flag. The signal strength detector may be a magnitude detector or an energy detector. The carrier drop detection threshold is preferably set to a level about 4 dB below the latched output of the energy detector responsive to setting of the flag. The flag may be set by setting a predetermined memory location as the flag or, alternatively, by setting a latch output line to an active state.

In another embodiment of the present invention, a carrier drop is detected corresponding to a silence transmission terminating a V.8 standard phase 1. The modem is then conditioned to receive a phase 2 INFO0 signal. The modem may be conditioned by starting a differential phase shift keyed (DPSK) receiver that receives the INFO0 signal.

In a further aspect of the present invention, a carrier drop detection system is provided including a demodulator that demodulates a received signal to provide signal data and a threshold circuit coupled to the demodulator that latches a carrier drop detection threshold at a level based on the received signal responsive to a selected data pattern in the signal data. A carrier drop detection circuit coupled to the threshold circuit detects a carrier drop based on the carrier drop detection threshold. The demodulator may be a frequency shift keyed (FSK) demodulator. In one embodiment, the carrier drop detection circuit includes an energy detector having an output corresponding to an energy level of the received signal, the output of the energy detector being latched responsive to the selected data pattern in the signal data and a comparator coupled to the output of the energy detector and to the carrier drop detection threshold. The selected data pattern in the data signal may be at least one of a CM signal and a JM signal. In one embodiment, the threshold circuit further includes a combiner coupled to the output of the energy detector and an offset that outputs the carrier drop detection threshold as the latched output of the energy detector reduced by the offset. In an alternative embodiment, the threshold circuit further includes a multiplier coupled to the output of the energy detector and a coefficient that outputs the carrier drop detection threshold as the latched output of the energy detector multiplied by the coefficient.

In a further embodiment of the present invention, a carrier drop detection system for a V.8 standard modem startup sequence is provided including a receiver circuit that receives a signal and a detector circuit coupled to the receiver circuit that detects at least one of a CM signal and a JM signal from the received signal. A signal strength detection circuit coupled to the receiver outputs a received signal strength for the received signal. A threshold circuit coupled to the receiver circuit latches a carrier drop detection threshold based on a current value of the received signal strength responsive to detection of at least one of the CM and the JM signal by the receiver circuit. A comparator circuit coupled to the threshold circuit and the signal strength detection circuit compares the received signal strength to the carrier drop detection threshold to detect a carrier drop corresponding to an end of the startup sequence.

As will further be appreciated by those of skill in the art, while described above primarily with reference to method aspects, the present invention may be embodied as methods, apparatus/systems and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a system, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention is typically written in a high level programming language such as C or C++. Nevertheless, some modules or routines may be written in assembly or machine language to optimize speed, memory usage, or layout of the software or firmware in memory. Assembly language is typically used to implement time-critical code segments.

Figure 3:
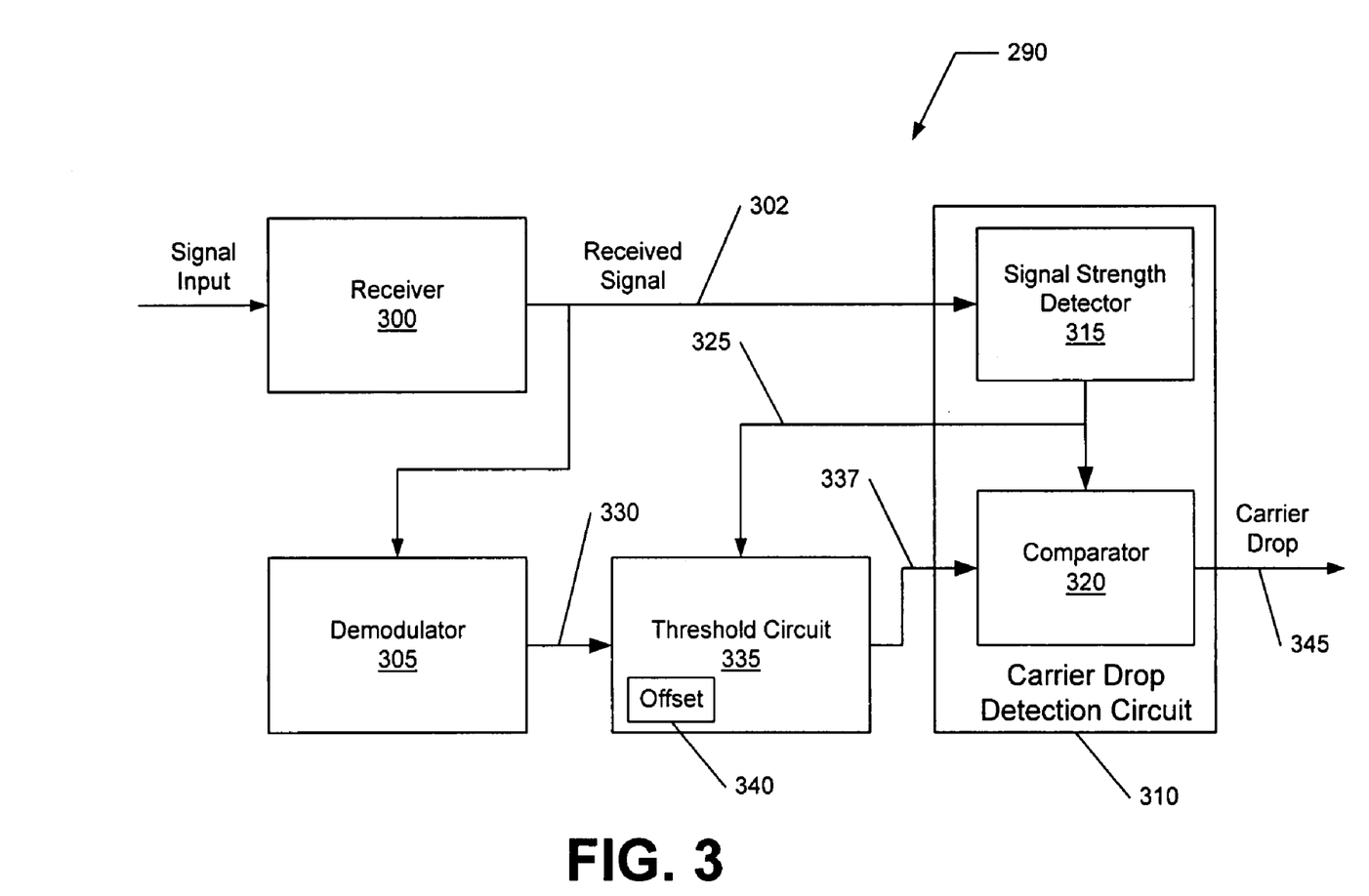
FIG. 3 is a block diagram of a carrier drop detection system for a modem in accordance with an embodiment of the present invention.

The present invention will now be further described with reference to the block diagram illustration of an embodiment of a carrier drop detection system of FIG. 3. As shown in the embodiment of FIG. 3, the carrier drop detection system 290 includes the receiver 300 which receives a signal input, such as over a Public Switched Telephone Network (PSTN), and outputs a received signal 302. The received signal 302 is provided to the demodulator 305 and to the signal strength detector circuit 315 which is contained within the carrier drop detection circuit 310. The carrier drop detection circuit 310 further includes a comparator 320 which outputs the carrier drop signal 345. The signal strength output 325 of the signal strength detector 315 is provided to the comparator 320 and also to the threshold circuit 335.

The demodulator 305 demodulates the received signal 302 to provide signal data 330. The threshold circuit 335 receives the signal data 330 from the demodulator 305 and latches a carrier drop detection threshold 337 at a level based on the signal strength 325 of the received signal 302 responsive to detection of a selected data pattern in the signal data 330. The carrier drop detection circuit 310 detects carrier drop with reference to the carrier drop detection threshold 337 and the signal strength 325.

Also shown in threshold circuit 335 is an offset 340 which may be an offset value used by the threshold circuit 335 to reduce the value of a signal strength 325 latched by the threshold circuit 335 to arrive at the carrier drop detection threshold 337. Alternatively, the offset 340 may be a coefficient and the carrier drop detection threshold 337 may be the latched value of the signal strength 325 multiplied by the coefficient. Accordingly, depending upon the embodiment as described above, the threshold circuit 335 may further include either a combiner (not shown) that outputs the carrier drop detection threshold 337 as the latched value of the signal strength 325 from the signal strength detector circuit 315 reduced by the offset 340 or a multiplier (not shown) that outputs the carrier drop detection threshold 337 as the latched value of the signal strength 325 multiplied by the coefficient.

The present invention will now be further described within the context of a particular embodiment directed to detection of the phase 1 to phase 2 transition for a V.90 (or V.34) client or analog modem. In particular, detection of the INFO0 signal at the start of phase 2 for a V.90 modem may be difficult in that the INFO0 signal in phase 2 is typically sent only once following the completion of phase 1 of the startup protocol. If for some reason, such as signal noise, the INFO0 signal is not received within the time window allowed for the INFO0 signal reception, a V.90 modem typically must time out and perform an error recovery procedure where the transmitter continuously sends the INFO0 signal to the remote modem and the receiver similarly continuously tries to detect the INFO0 signal coming from the remote modem. Accordingly, performance may be improved by reliable detection of the INFO0 signal initially without the use of an INFO0 recovery procedure. One approach to this problem is to provide a robust receiver for the INFO0 signal which, typically, is received by a differential phase shift keyed (DPSK) receiver. Alternatively, or an addition to the use of such a robust receiver, the phase 1 to phase 2 transition may be accurately and reliably detected to improve performance. Carrier drop detection methods, systems and computer program products according to the present invention are particularly beneficial for applications such as the detection of the phase 1 to phase 2 transition as will now be further described with reference to FIG. 4.

Figure 4:
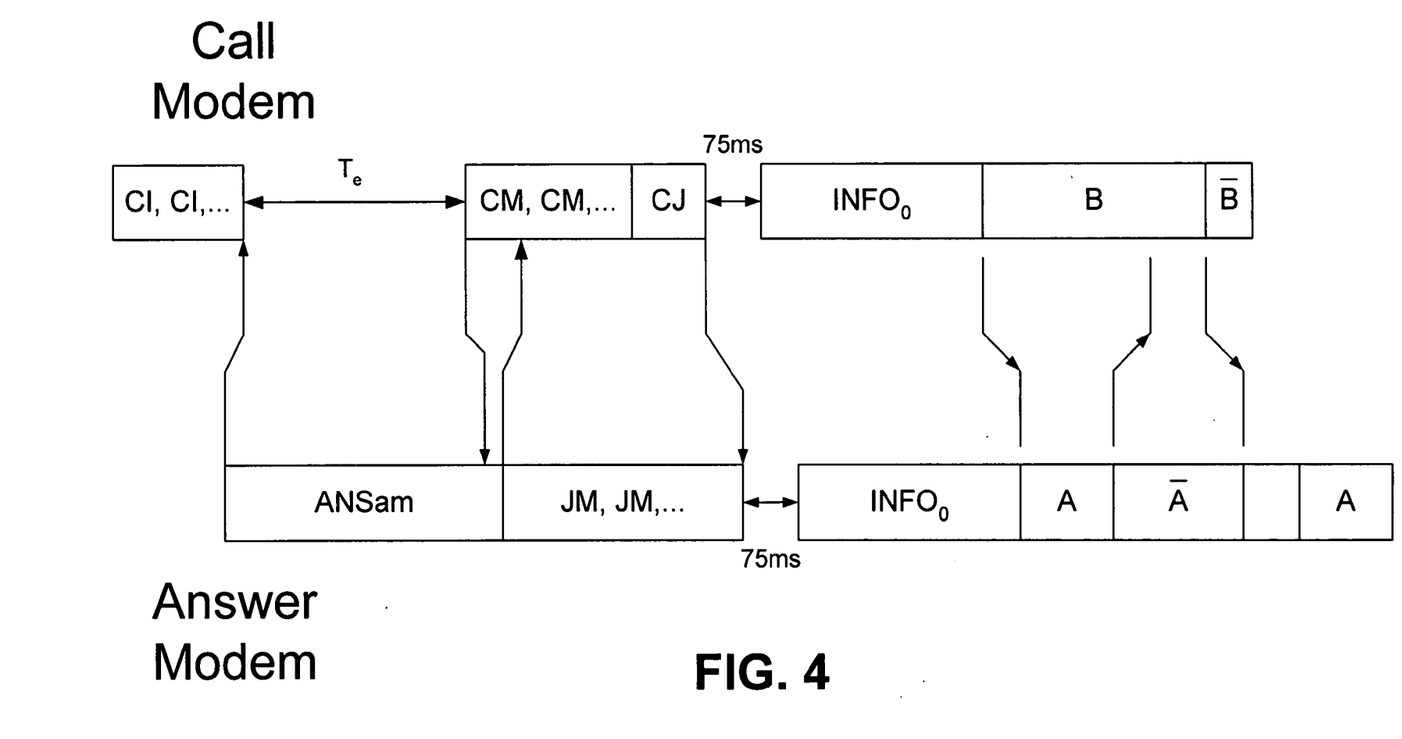
FIG. 4 is a signal sequencing diagram illustrating the exchange of messages and tones between a server modem and a client modem during phase 1 and part of phase 2 operations pursuant to the V.90 standard.

Tone and message transmissions with their respective relative timing for the server modem and the client modem are illustrated in FIG. 4. In the illustration of FIG. 4, the client/analog modem acts as the call modem which transmits CI (or CT or CNG) and conditions its receiver to detect the answer signal ANSam (or ANS) as per the V.8 protocol recommendation. After the signal ANSam is detected, the call modem transmits silence for the period $T_c$. The call modem then conditions its receiver to detect JM and transmits the signal CM with the appropriate bit set to indicate that V.90 operation is desired. When a minimum of two identical JM sequences have been received, the call modem completes the current CM octet and sends CJ. After sending CJ, the call modem transmits silence for 75 milliseconds plus or minus 5 milliseconds before proceeding with the phase 2 signal procedures. As shown in FIG. 4, the phase 2 signals from the call modem begin with transmission of the INFO0 signal.

The answer (or server/digital) modem, as illustrated in FIG. 4, transmits the ANSam signal and conditions its receiver to receive CM. After two identical CM sequences are received with the appropriate bit set to indicate V.90 operation, the answer modem sends JM and conditions its receiver to detect CJ. After receiving the three specified octets of CJ, the answer modem transmits silence for 75 milliseconds plus or minus 5 milliseconds and proceeds with phase 2 of the startup procedures.

During the 75 millisecond silence period ending phase 1, both the call modem and answer modem start their INFO0 DPSK receivers to detect the INFO0 signal. For example, with reference to the call modem side, as soon as the detection of the JM signal is completed, the V.8 supporting circuitry of the call modem starts to monitor for carrier drop of the phase 1 signal (specified pursuant to the V.21 protocol recommendation). On detection of the carrier drop, the V.8 circuitry of the call modem signals to the rest of the modem system that the phase 1 receiving task is completed and the 75 millisecond silence period has started. The DPSK INFO0 receiver then begins operation. In known V.90 modems, an absolute carrier drop threshold is compared with an energy detector output and, once the energy detector output drops below the set carrier drop threshold, carrier drop is said to be detected.

While an absolute carrier drop may work well under normal line conditions, trouble may result under various line conditions which can cause a wrong start time for the INFO0 DPSK receiver which in turn results in a failure to detect the original INFO0 signal and the need to enter INFO0 error recovery procedures. For example, under noisy line conditions, it may be difficult to reliably and repeatedly detect carrier drop. This is particularly difficult in contexts such as the V.90 sequence described above as the transmissions during which carrier drop detection is applied are "silence" conditions and it is generally hard to establish a fixed threshold for detection of carrier drop during a silence period. This problem is further magnified by the relatively short duration of the 75 millisecond silence period between phase 1 and phase 2. As a result of this short period, it is possible with prior approaches that the carrier detector output may not even have an opportunity to drop, i.e., to reach the threshold for drop detection, within the 75 millisecond time frame, which results in a failure to detect carrier drop. Also, as the phase 2 INFO0 signal is inband to the V.21 reception, the echo of the INFO0 signal itself could also disturb the carrier detector's energy output. Accordingly, the present invention provides for establishment of a relative threshold for use in detecting the phase 1 to phase 2 transition. As will be described further herein, the present invention utilizes recognition of receipt of the CM and/or JM signal respectively, depending upon whether it is the call modem or the answer modem, to initiate updating of the carrier threshold.

Referring again to FIG. 3, the illustrated embodiment of the present invention will be further described with reference to the application and detection of carrier drop between phase 1 and phase 2 for a V.90 modem. For this embodiment, the demodulator 305 may be a frequency shift keyed (FSK) demodulator as phase 1, pursuant to the V.8 standard recommendation, includes transmissions of CM (or JM) packets containing one and zero patterns modulated using V.21 standard FSK modulation. While such signals typically cannot be detected through the use of tone detection, they may be recognized through demodulation and comparison to the expected associated patterns pursuant to the V.8 standard. In addition, the signal strength detector 315 is preferably an energy detector which is configured to detect an energy level of the received signal 302. While it is possible to utilize a signal strength detector 315 which is a magnitude type detector, it is preferable that an energy detector be utilized in accordance with the present invention. Furthermore, as described previously with reference to FIG. 4, the threshold circuit 335 latches the output of the signal strength detector 315 on recognition of at least one of the CM signal or the JM signal as the selected data pattern in the data signal 330. Accordingly, the threshold circuit 335 further comprises a detector circuit which is coupled to the receiver 300 through the demodulator 305 so as to detect at least one of the CM signal or the JM signal.

It is further to be understood that while the receiver 300 and the modulator 305 are illustrated as separate blocks in FIG. 3 they may be combined. Similarly, other blocks or combinations of blocks in FIG. 3 may be implemented in whole or in part as code executing on a processor, in custom chips, in discrete devices or as a combination of the above.

Figure 5:
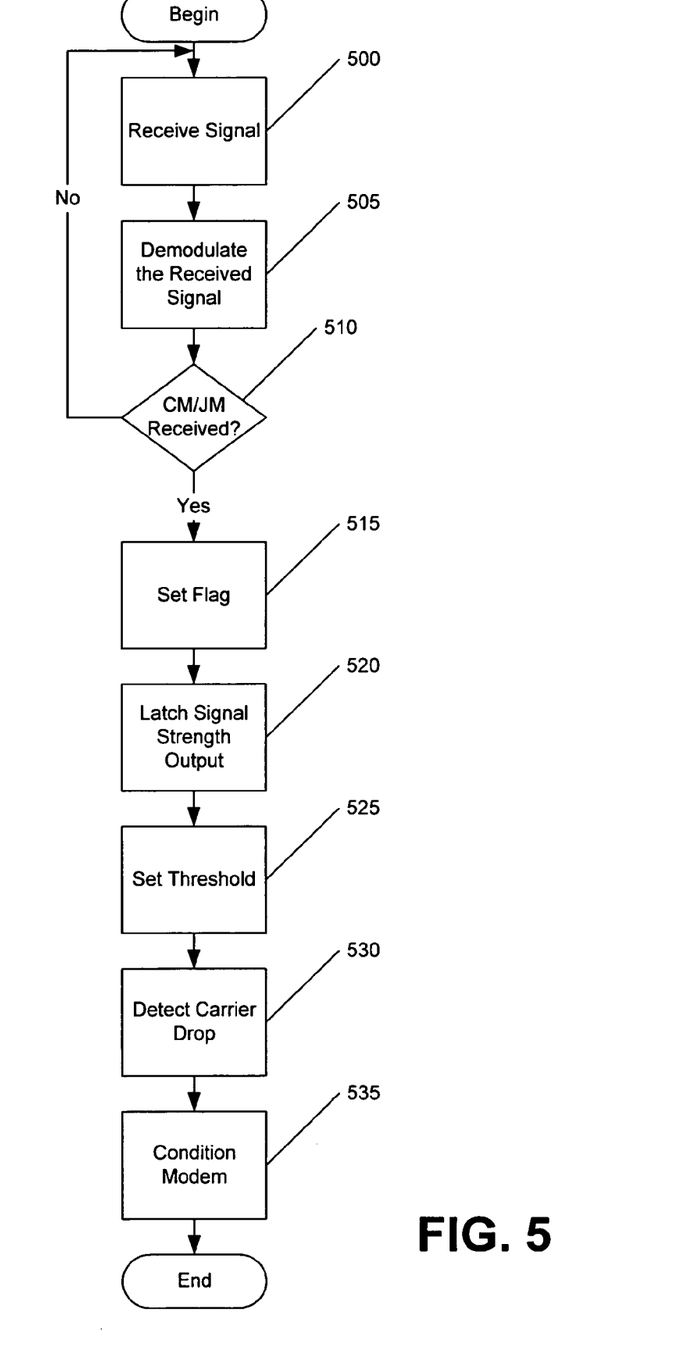
FIG. 5 is a flowchart illustrating operations of a carrier drop detection system shown in FIG. 3.

Operations according to the present invention will now be further described with reference to the embodiment illustrated in the flow chart of FIG. 5. As shown in FIG. 5, operations begin at block 500 with receipt of the signal by the modem including the carrier drop detection system 290. The received signal is demodulated to provide signal data (block 505). As will be described further with reference to blocks 510 through 525, a carrier drop detection threshold is updated based on the received signal responsive to a selected data pattern in the signal data.

As the illustrated embodiment of FIG. 5 relates to detection of the phase 1 to phase 2 transition for a modem using a V.8 standard during startup, the signal data from block 505 is evaluated to detect a selected data pattern in the signal data corresponding to at least one of a CM signal or a JM signal depending upon whether the modem is acting as the call modem or the answer modem (block 510). If a CM or JM signal is not received, operations return to block 500. Once a CM or a JM signal is detected (block 510), a flag is set to indicate to the rest of the modem system that a valid CM or JM has been received (block 515). The phase I V.21 standard receiver (not shown) within the circuitry of the threshold circuit 335 latches the output of the signal strength (energy) detector 315 (block 520). Accordingly, the current output of the energy detector 315 is latched responsive to setting of the flag indicating receipt of a valid CM or JM signal.

The carrier drop detection threshold 337 is then set to a value a predetermined amount below the last output of the signal strength detector 315 responsive to the setting of the flag (block 525). In one embodiment of the present invention, the relative threshold value for the carrier drop detection threshold 337 is set to a level four dB (decibels) below that of the latched output of the signal strength detector 315. Subsequently, on receipt of the silence transmission between phase 1 and phase 2, a carrier drop is detected when the output of the signal strength (energy) detector 315 drops below the updated threshold as detected by the comparator 320 (block 530). Finally, following detection of a carrier drop (block 530), the modem is conditioned to receive the phase 2 INFO0 signal (block 535). More particularly, the conditioning operations at block 535 may include starting a Differential Phase Shift Keyed (DPSK) receiver to receive the INFO0 signal.

In a preferred embodiment, the flag set operations at block 515 comprise setting a predetermined memory location as the flag which memory location is accessible to the various program code modules executing on the modem. Alternatively, operations at block 515 can utilize a hardware connection where setting of the flag comprises setting a latched output line to an active state to initiate latching operations as described above.

The systems, methods and computer program products according to the present invention provide for the use of an updated or relative carrier drop threshold. As a result, modem transition timing, such as the phase 1 to phase 2 transition timing for V.90 modem, may be more reliably detected across a variety of line conditions. The present invention may, thereby, provide for improved reliability of operations following carrier drop detection, such as the detection of the phase 2 INFO0 signal in a V.90 (or a V.34) modem.

The present invention has been described above with reference to the block diagram illustration of FIG. 3. and the flowchart illustration of FIG. 4. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is to be understood that many variations and modifications can be made to the embodiments described herein above without substantially departing from the principles of the present invention. All such variations and modifications are intended to be included herein within the scope of the present invention, as set forth in the following claims.

We claim:

1. A method for modem carrier drop detection comprising the steps of:
    demodulating a received signal to provide signal data;
    detecting a signal strength for a portion of the received signal corresponding to a selected data pattern in the signal data;
    establishing a carrier drop detection threshold at a determined level relative to the signal strength; and
    detecting a carrier drop based on the carrier drop detection threshold;
    wherein the modem uses a V.8 standard during startup and the step of establishing comprises the step of establishing the carrier drop detection threshold responsive to a selected data pattern in the signal data corresponding to at least one of a call menu (CM) signal and a joint menu (JM) signal.

2. A method for modem carrier drop detection comprising the steps of:
    demodulating a received signal to provide signal data;
    setting a flag to indicate receipt of at least one of a valid call menu (CM) signal and a valid joint menu (JM) signal;
    latching an output of a signal strength detector responsive to setting of the flag, the signal strength detector being coupled to the received signal and the output of the signal strength detector corresponding to a signal strength level of the received signal;
    setting a carrier drop detection threshold to a value a predetermined amount below the latched output of the signal strength detector responsive to setting of the flag; and
    detecting a carrier drop based on the carrier drop detection threshold.

3. A method according to claim 2 wherein the signal strength detector is a magnitude detector.

4. A method according to claim 2 wherein the signal strength detector is an energy detector.

5. A method according to claim 4 wherein the step of setting a carrier drop detection threshold further comprises the step of setting the carrier drop detection threshold to a level about 4 dB below the latched output of the energy detector responsive to setting of the flag.

6. A method according to claim 2 wherein the detecting a carrier drop step further comprises the step of detecting a carrier drop corresponding to a silence transmission terminating a V.8 standard phase 1 and wherein the detecting a carrier drop step is followed by the step of conditioning the modem to receive a phase 2 information (INFO0) signal.

7. A method according to claim 6 wherein the conditioning step further comprises the step of starting a differential phase shift keyed (DPSK) receiver that receives the NFO0 signal.

8. A method according to claim 2 wherein the step of setting a flag further comprises setting a predetermined memory location as the flag.

9. A method according to claim 2 wherein the step of setting a flag further comprises the step of setting a latch output line to an active state.

10. A carrier drop detection system comprising:
    a demodulator that demodulates a received signal to provide signal data;
    a threshold circuit coupled to the demodulator that latches a carrier drop detection threshold at a level based on the received signal responsive to a selected data pattern in the signal data; and
    a carrier drop detection circuit coupled to the threshold circuit that detects a carrier drop based on the carrier drop detection threshold, wherein the carrier drop detection circuit further comprises:
        an energy detector having an output corresponding to an energy level of the received signal, the output of the energy detector being latched responsive to the selected data pattern in the signal data; and
        a comparator coupled to the output of the energy detector and to the carrier drop detection threshold; and
    wherein the threshold circuit further comprises a combiner coupled to the output of the energy detector and an offset that outputs the carrier drop detection threshold as the latched output of the energy detector reduced by the offset.

11. A carrier drop detection system according to claim 10 wherein the demodulator is a frequency shift keyed (FSK) demodulator.

12. A carrier drop detection system according to claim 10 wherein the threshold circuit further comprises a multiplier coupled to the output of the energy detector and a coefficient that outputs the carrier drop detection threshold as the latched output of the energy detector multiplied by the coefficient.

13. A carrier detection system according to claim 10 wherein the selected data pattern in the data signal is at least one of a call menu (CM) signal and a joint menu (JM) signal.

14. A carrier drop detection system for a V.8 standard modem startup sequence, the system comprising:
 a receiver circuit that receives a signal;
 a detector circuit coupled to the receiver circuit that detects at least one of a call menu (CM) signal and a joint menu (JM) signal from the received signal;
 a signal strength detection circuit coupled to the receiver that outputs a received signal strength for the received signal;
 a threshold circuit coupled to the receiver circuit that latches a carrier drop detection threshold based on a current value of the received signal strength responsive to detection of at least one of the CM and the JM signal by the receiver circuit; and
 a comparator circuit coupled to the threshold circuit and the signal strength detection circuit that compares the received signal strength to the carrier drop detection threshold to detect a carrier drop corresponding to an end of the startup sequence.

15. A carrier drop detection system comprising:
 means for demodulating a received signal to provide signal data;
 means for detecting a signal strength for a portion of the received signal corresponding to a selected data pattern in the signal data;
 means for establishing a carrier drop detection threshold at a determined level relative to the signal strength; and
 means for detecting a carrier drop based on the carrier drop detection threshold;
 wherein the modem uses a V.8 standard during startup and the means for establishing comprises means for establishing the carrier drop detection threshold responsive to a selected data pattern in the signal data corresponding to at least one of a call menu (CM) signal and a joint menu (JM) signal.

16. A carrier drop detection system comprising:
 means for demodulating a received signal to provide signal data;
 means for setting a flag to indicate receipt of at least one of a valid call menu (CM) signal and a valid joint menu (JM) signal;
 a signal strength detector coupled to the received signal and having an output corresponding to a signal strength level of the received signal;
 means for latching an output of the signal strength detector responsive to setting of the flag;
 means for setting a carrier drop detection threshold to a value a predetermined amount below the latched output of the signal strength detector responsive to setting of the flag; and
 means for detecting a carrier drop based on the carrier drop detection threshold.

17. A system according to claim 16 wherein the signal strength detector is a magnitude detector.

18. A system according to claim 16 wherein the signal strength detector is an energy detector.

19. A system according to claim 18 wherein the means for setting further comprises means for setting the carrier drop detection threshold to a level about 4 dB below the latched output of the energy detector responsive to setting of the flag.

20. A system according to claim 16 wherein the means for detecting a carrier drop further comprises means for detecting a carrier drop corresponding to a silence transmission terminating a V.8 standard phase 1 and further comprising means for conditioning the modem to receive a phase 2 information (INFO0) signal.

21. A system according to claim 20 wherein the means for conditioning further comprises means for starting a differential phase shift keyed (DPSK) receiver that receives the INFO0 signal.

22. A system according to claim 16 wherein the means for setting a flag further comprises means for setting a predetermined memory location as the flag.

23. A system according to claim 16 wherein the means for setting a flag further comprises means for setting a latch output line to an active state.

24. A computer program product for carrier drop detection, comprising:
 a computer readable storage medium having computer readable program code means embodied therein, the computer readable code means comprising:
  computer readable code which demodulates a received signal to provide signal data;
  computer readable code which detects a signal strength for a portion of the received signal corresponding to a selected data pattern in the signal data;
  computer readable code which establishes a carrier drop detection threshold at a determined level relative to the signal strength; and
  computer readable code which detects a carrier drop based on the carrier drop detection threshold; and
 wherein the modem uses a V.8 standard during startup and the computer readable code which establishes a carrier drop detection threshold comprises computer readable code which establishes the carrier drop detection threshold responsive to a selected data pattern in the signal data corresponding to at least one of a call menu (CM) signal and a joint menu (JM) signal.

25. A computer program product for carrier drop detection, comprising:
 a computer readable storage medium having computer readable program code means embodied therein, the computer readable code means comprising:
  computer readable code which demodulates a received signal to provide signal data;
  computer readable code which sets a flag to indicate receipt of at least one of a valid CM signal and a valid JM signal;
  computer readable code which outputs a signal strength level of the received signal;
  computer readable code which latches the output of the computer readable code which outputs a signal strength level responsive to setting of the flag;
  computer readable code which sets a carrier drop detection threshold to a value a predetermined amount below the latched output responsive to setting of the flag; and
  computer readable code which detects a carrier drop based on the carrier drop detection threshold.

26. A computer program product according to claim 25 wherein the computer readable code which outputs a signal strength level of the received signal outputs a magnitude.

27. A computer program product according to claim 25 wherein the computer readable code which outputs a signal strength level of the received signal outputs an energy level.

28. A computer program product according to claim 27 wherein the computer readable code which sets further comprises computer readable code which sets the carrier drop detection threshold to a level about 4 dB below the latched output responsive to setting of the flag.

29. A computer program product according to claim 25 wherein the computer readable code which detects a carrier drop further comprises computer readable code which detects a carrier drop corresponding to a silence transmission terminating a V.8 standard phase 1 and further comprising computer readable code which conditions the modem to receive a phase 2 information (INFO0) signal.

30. A computer program product according to claim 29 wherein the computer readable code which conditions further comprises computer readable code which starts a differential phase shift keyed (DPSK) receiver that receives the INFO0 signal.

31. A computer program product according to claim 25 wherein the computer readable code which sets a flag further comprises computer readable code which sets a predetermined memory location as the flag.

32. A computer program product according to claim 25 wherein the computer readable code which sets a flag further comprises computer readable code which sets a latch output line to an active state.

* * * * *